SEARCH ROOM

Nov. 25, 1958 C. G. SERIGHT 2,862,052

OVERLOAD PROTECTION CIRCUITS

Filed July 25, 1955

T358/7

X5173

INVENTOR.
Carl G. Seright
BY
[signature]
ATTORNEY

United States Patent Office 2,862,052

Patented Nov. 25, 1958

2,862,052

OVERLOAD PROTECTION CIRCUITS

Carl G. Seright, Trenton, N. J., assignor to Radio Corporation of America, a corporation of Delaware Application July 25, 1955, Serial No. 524,089

10 Claims. (Cl. 178—7.3)

The present invention relates generally to overload protection circuits and particularly to circuits for preventing overload of the high voltage supply or kinescope in a color television signal receiving system.

In a television receiver in which the video or luminance signal handling circuits between the second detector and the image reproducing device are direct coupled, the direct current component of the detected luminance signal is applied to the video signal amplifier control grid circuit along with the luminance signal variation components. The direct current component determines the average voltage in the anode circuit of the luminance signal amplifier and is a direct function of the average brightness in the scene being televised.

This is an ideal operating condition except for scenes of high average brightness, in which the kinescope ultor current may exceed the permissible maximum, or the high voltage power source may be overloaded. Under either of these circumstances, image deterioration is caused through misconvergence and defocusing. The contrast and/or brightness controls may be reduced to avoid overload on high average brightness scenes. However, this results in the reproduction of scenes of normal or low average brightness at a highlight and average brightness level greatly below that desirable and below the average capability of the kinescope and high voltage power supply.

An object of the present invention is to provide an improved circuit for preventing overload of image reproducing devices and associated power sources.

It is a further object of the present invention to provide an improved circuit arrangement for preventing sustained overload of either an image reproducing device or the associated power supply without sacrificing brightness on scenes having high peak but low average brightness.

It is another object of the present invention to provide a kinescope and power supply protection circuit for preventing overload thereof without loss of the direct current component.

In accordance with the present invention, sustained overload of the voltage source or excessive current in the image reproducing device is substantially prevented by altering the direct current coupling between the luminance amplifier and the luminance detector and by reducing the gain of the receiving system during high average brightness scenes. This reduction in gain may be effected under the dynamic control of signal information in the luminance amplifier load circuit indicating a deviation from a predetermined circuit condition.

Figure 1:
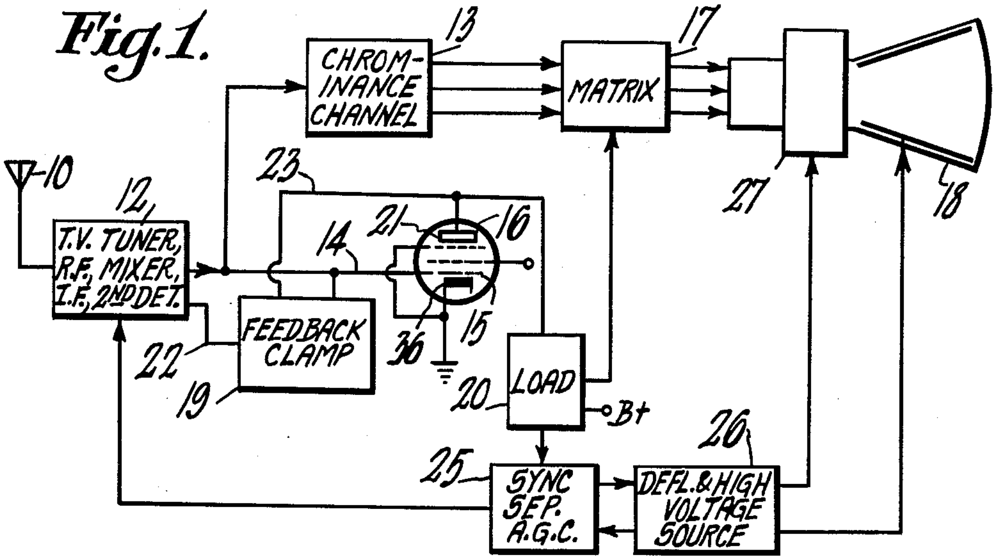
Figures 2, 3:
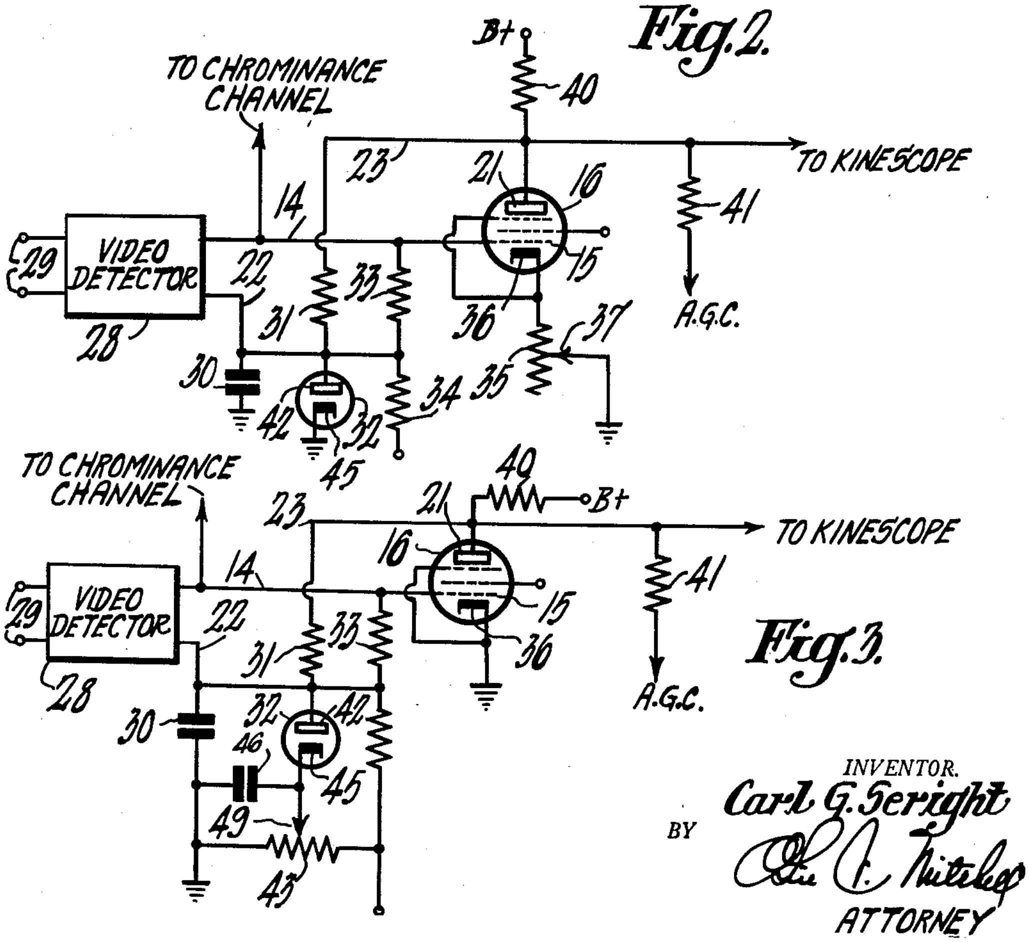

Other objects and advantages of the present invention will become apparent from a reading of the following specification and an inspection of the accompanying drawings in which:

Figure 1 illustrates, by way of a block diagram, a color television signal receiving system embodying the present invention; and Figure 2 is a schematic circuit diagram of an overload protection circuit provided in accordance with the present invention; and Figure 3 is a schematic circuit diagram of a further embodiment of an overload protection circuit provided in accordance with the present invention.

Referring to the drawings, and particularly to Figure 1, there is shown a color television receiver of well-known form such, for example, as that described in "Practical Color Television for the Service Industry," published by RCA Service Company, Inc., Camden, New Jersey, Second Edition, April 1954. While the specific form of signal processing apparatus involved does not constitute a part of the invention, it may be noted that the receiver may be adapted to operate upon signals made up in accordance with standards set by the Federal Communication Commission on December 17, 1953.

In accordance with those standards, information regarding the luminance of a television scene is transmitted by a luminance signal which is an amplitude-modulation of a main carrier wave with video signals proportional to the elemental brightness values of the scene, and the chrominance information is transmitted by a phase and amplitude-modulated subcarrier wave. The instantaneous phase of the chrominance subcarrier wave with respect to a color reference phase is indicative of a selected hue and the instaneous amplitude of the wave is proportional to the degree of saturation of the hue. The subcarrier wave is conventionally modulated with color difference signals rather than the video signals representative directly of the composite color.

The antenna 10, in the apparatus of Figure 1, is adapted to intercept the television signal and to apply it to the input terminals of a television tuner section 12 which may be understood as including the usual radio-frequency, mixer, intermediate-frequency and second detector stages. The detected signal information is applied simultaneously to a chrominance channel 13 and through lead 14 to the control electrode 15 of an electron discharge device 16 utilized as a luminance signal amplifier.

It is, of course, to be understood that this is a simplified showing of the interaction of the various portions of a color television receiving system. Color difference signals are derived from the chrominance subcarrier wave and applied along with the amplified luminance signal to a matrix 17. The color matrix 17 is adapted to combine the signals received from the chrominance channel and from the luminance channel in such a manner as to provide color signals which may be applied to an image reproducing device or kinescope 18. The kinescope 18 may be of the type described in the article entitled "Three-gun video mask color kinescope" by H. B. Law which appeared in the October 1951 issue of Proceedings of the I. R. E.

An overload protection control circuit 19, as will be discussed more fully hereinafter, is connected between the control grid 15 and a point of fixed reference potential and is effective under the control of the signal level to alter the direct current level of the signal information applied to the control grid 15. Amplified luminance signal information is derived from a load circuit 20 illustrated as a rectangle connected with the anode 21 of the luminance signal amplifier device 16. A signal is also derived from the load circuit 20 and applied to a sync separator and AGC circuit 25 of the receiving system in order to derive therefrom the synchronizing signals which are utilized to synchronize a deflection apparatus 26 of the receiving system with that of the transmitting system. The deflection and high voltage apparatus 26 is connected to the deflection yokes 27 in order to provide a rectangular scanning raster on the face of the kinescope 18. The high voltage which is developed in the high voltage and deflection apparatus 26 is also applied to the kinescope 18 in order to provide electron beam acceleration.

The AGC system utilized in any particular color television receiving system may be of the keyed variety.

With this type of AGC system a flyback pulse is applied from the deflection and high voltage apparatus 26 to the sync separator and AGC portion 25 to establish, in cooperation with the D.-C. level of the signal information received from the luminance signal amplifier 16, an AGC voltage which is representative of the D.-C. level of the synchronizing impulses of the received signal. The AGC voltage, thus developed, is applied to one or more of the signal translating portions of the receiving system in order to control the gain of these stages as an inverse function of the carrier amplitude of the received signal.

Those portions of the television receiving system, above-discussed, with the exception of the overload protection control circuit 19 may be of conventional design and are adapted to receive and translate a color television signal in such a manner as to provide an image of the televised subject on the face of the kinescope 18. It has been found, however, that with conventional receiving systems, a high luminance condition tends to result in an excessively high current condition in the kinescope.

In accordance with one aspect of the present invention, a high current condition in the kinescope or an overload of the high voltage supply is prevented by establishing at the control grid 15 a predetermined signal translating level beyond which the operation of the luminance signal amplifier 16 is dynamically affected to substantially prevent the application of signals to the kinescope which contain a D.-C. component of such magnitude as would cause excessive currents.

The D.-C. level of signal information applied to the kinescope and to the automatic gain control system is maintained at a level below that which would provide deleterious operation by altering the D.-C. level of the signal information applied to the control grid 15 of the luminance signal amplifier 16. A specific circuit for accomplishing this is illustrated in Figure 2 to which reference is now made.

The signals ultimately applied to the luminance signal amplifier 16 may be derived from a luminance or video detector illustrated as a rectangle 28 having a pair of signal input terminals 29 to which signal information may be applied from the intermediate frequency amplifier portion of an associated receiving system. One signal output terminal of the video detector 28 is directly connected to the control grid 15 by means of the conductor 14 while the other signal output terminal is connected to the ungrounded terminal of a bypass capacitor 30 by means of a lead 22. For proper operation of the circuit as illustrated, the detector output signal should be sync negative. The ungrounded terminal of the bypass capacitor 30 is also connected to the junction of a feedback resistor 31 and a unilaterally conducting device or diode 32 connected in series arrangement between the anode 21 and a point of fixed reference potential or signal ground and to the junction of the video detector load resistor 33 and a grid resistor 34 which are connected in series arrangement between the control grid 15 and the negative terminal of a bias source which may be of relatively low voltage.

A contrast control is provided by means of a variable resistor 35 which is connected to the cathode 36 and includes a variable tap 37 connected directly to signal ground.

The load circuit for the luminance signal amplifier 16 includes a load resistor 40 connected between the anode 21 and the positive terminal B+ of a source of direct current potential such as the low voltage supply for the associated receiving system. The negative terminal of low voltage supply is connected directly to signal ground. It is to be understood that the load circuit illustrated in Figure 2 is a simplified one and that in actual operation peaking coils and other circuit elements may be present.

Signal information may be derived directly from the anode 21 and applied to the control electrodes of the associated color kinescope or matrix depending on the particular system utilized. The direct current component of the luminance signal available at the anode 21 is applied through an isolating resistor 41 to the automatic gain control portion of the associated receiving system in order to control the gain of the overall system as above discussed.

The effect of the capacitor 30 and the diode 32 may now be more fully described in connection with the operation of the circuit illustrated in Figure 2. The diode 32 may be of the thermionic vacuum tube or crystal type and may be considered as a switch or clamp controlled by the voltage available at the junction of the detector load resistor 33 and the grid resistor 34. The voltage at the junction of these resistors is a function of the voltage at the anode 21. The magnitude of the bias voltage and the values of grid resistor 34 and the feedback resistor 31 are chosen such that under average brightness conditions, the voltage at the anode 42 of the diode 32 tends to be positive with respect to ground thereby rendering the diode 32 conductive and effectively grounding the junction of these two resistors. Under this condition, the only signal voltage input to the amplifier 16 is that developed across the detector load resistor 33, and any change in the average potential at the anode 21 is directly proportional to changes in the average potential across the detector load resistor 33.

For luminance signals having a high average brightness condition, the average detector output signal is low thereby causing voltage at the anode 21 to be more negative. Accordingly, the feedback voltage applied to the anode 42 of the diode 32 through the conductor 23 and the feedback resistor 31 is more negative causing the diode 32 to open or become non-conductive. The opening of the diode 32 is effective to insert the voltage drop appearing across the grid resistor 34 in series with the signal voltage developed across the detector load resistor 33 thereby reducing the conductivity of the luminance signal amplifier 16 which results in the anode voltage becoming more positive than it would be without the degenerative feedback.

Since, under these conditions, the voltage at the anode 21 is more positive than it would be if the luminance signal amplifier 16 were actuated only by the signal received from the video detector 28, the automatic gain control portion of the system is operative to reduce the overall gain of the associated signal translating portions of the receiving system thereby tending to reduce the application of signal information which might result in an overload condition in the associated color kinescope. However, it may be noted that the operation of the overload protection control circuit reduces the possibility of an excessive current condition in the kinescope since the direct current level of the signal is altered in accordance with the action of the overload protection control circuit. It may be also noted that the alternating current components of the translated video signal are not altered in view of the fact that the bypass capacitor 30 is effective to maintain the anode 42 of the diode 32 at signal ground for these alternating current components.

The extent to which the direct current component of video signal is altered or compressed with respect to the alternating current components of the signal may be referred to as the compression ratio. The compression ratio introduced by the gated feedback provided in accordance with the present invention may, for circuit values typical of conventional practice, be in the order of two or three to one, and may be greatly increased beyond this by more favorable proportioning of the circuit, for example, by proportionate increases in the value of the fixed negative bias and in the value of the grid resistor 34 so as to increase the feedback factor. The magnitude of the feedback factor may also be increased by substituting a fixed voltage device such as a neon tube for a portion of the feedback resistor 31. In any event, the feedback factor for the alternating current components of the detected signal always approaches zero due to the operation of the by-pass capacitor 30. Accordingly, the high-light to average and the average to low-light brightness ratios are therefore not altered.

Under signal conditions which would tend to provide an excessively high luminescent condition in the kinescope, the diode gate 32 opens thereby resulting in an average voltage at the anode 16 which is more positive than it would otherwise be. The sync tips which operate the associated automatic gain control system therefore become more positive as though the signal level were increased and the automatic gain control voltage tends to reduce the amplitude of the detected signal. This aids the limiting action so that the overall benefit is greater than that achieved merely on the basis of the luminance signal amplifier direct current change.

A further embodiment of the present invention is illustrated in Figure 3, wherein the cathode contrast control of Figure 2 is replaced by a grid circuit contrast control which is effective to simultaneously adjust the D.-C. level at which the feedback clamp will open. This is accomplished by means of a potentiometer connected between the negative terminal of the bias source and having an adjustable slider 44 connected to the cathode 45 of the diode 32. A bypass capacitor 46 is connected between the cathode 45 and signal ground.

Since cathode degeneration is omitted in the arrangement of Figure 3, the luminance signal amplifier 16 provides a greater initial gain. This permits a greater gain reduction ratio when the clamp opens thereby providing an increased compression ratio. This increased compression ratio may be even further increased as above discussed by an increase in the value of the fixed negative bias or by the use of a fixed voltage device in the feedback circuit.

With this arrangement, the reference level to which the diode clamp is returned is adjusted concomitantly with an adjustment of the contrast control. That is, the D.-C. level at the anode 21 at which the diode 42 opens is determined by the voltage at the cathode 45. And, the voltage at the cathode 45 is determined by the adjustment of the contrast control.

The overload protection circuit provided in accordance with the present invention therefore prevents the application of an excessive direct current signal component to an associated image reproducing device in a color television receiving system. The proportion of the direct current to the alternating current components of the signal is affected under the dynamic control of the signal level in the luminance signal amplifier stage. This is accomplished by means of a gated feedback circuit which is effective to alter the direct current level of the signal information applied to the luminance signal amplifier. The alternating current signal level is altered substantially only by the resulting ACG action. This compression, however, is linear providing the same compression in dark-to-average and average-to-light video voltage transitions.

Having thus described the present invention, what is claimed is:

1. A video signal amplifier comprising in combination, a signal input circuit adapted to receive a television signal including an alternating current component and a direct current component indicative of the luminance of a televised scene, a signal output circuit, and a direct current conductive feedback circuit including a clamp circuit connected between said input and output circuits, said clamp circuit having an element of low impedance to said alternating current component to prevent said alternating component from existing across said clamp circuit, said input circuit comprising means including a source of reference voltage coupled to said feedback clamp circuit to render said feedback clamp circuit effective under normal average luminance signal conditions to provide a first direct current signal translating level in said input circuit and to render said clamp circuit ineffective under high average luminance signal conditions whereby to provide a predetermined direct current signal translating level in said input circuit.

2. A video signal amplifier comprising in combination a signal input circuit adapted to receive a television signal including an alternating current component and a direct current component indicative of the luminance of a televised scene, a signal output circuit, and a direct current conductive feedback circuit connected between said input and output circuits and including a unilaterally conducting device, said input circuit comprising means including a source of reference voltage to render said device conductive under normal average luminance signal conditions and to render said device non-conductive under high average luminance signal conditions, thereby to provide a predetermined direct current signal translating level in said input circuit, and an impedance element operatively connected in said feedback path to prevent said alternating current component from appearing across said unilateral conducting device, said impedance element having a low impedance to said alternating current component.

3. A video signal amplifier comprising in combination, a signal input circuit adapted to receive a television signal including an alternating current component and a direct current component indicative of the luminance of a televised scene, a signal output circuit, a direct current conductive feedback circuit connected between said input and output circuits and including a unilaterally conducting device, said input circuit having means including a source of reference voltage to render said device conductive under normal average luminance signal conditions, said feedback circuit being effective under high average luminance signal conditions to render said device non-conductive to provide a predetermined direct current signal translating level in said input circuit, and a capacitor connected in shunt with said device for providing a low impedance current path for said alternating current component.

4. In a color television receiving system, the combination comprising, signal translating means for processing a received signal, a video signal amplifier having a signal input circuit direct coupled with said signal translating means and a signal output circuit, a direct current conductive feedback circuit connected between said output and input circuits and including a unilaterally conducting device, means for applying a forward bias across said device, the magnitude of the voltage provided by said feedback circuit being sufficient when the magnitude of the average direct voltage of said output circuit reaches a predetermined value to overcome said forward bias to thereby render said device non-conductive and provide at least a portion of said predetermined direct voltage in said input circuit and a capacitor connected in shunt with said device for providing a low impedance current path for said alternating current component, and automatic gain control means connected between said output circuit and said signal translating means for controlling the gain of said system as a function of the amplitude of said received signal.

5. In a color television receiving system, the combination comprising, signal translating means for processing a received signal having a direct current component indicative of the luminance of a televised scene and a synchronizing component, a video signal amplifier having a signal input circuit direct coupled with said signal translating means and a signal output circuit, a direct current conductive feedback circuit connected between said output and input circuits and including a unilaterally conducting device, means associated with said feedback circuit for applying a forward bias across said device, the magnitude of the voltage provided by said feedback circuit being sufficient under high average luminance conditions to overcome said forward bias to thereby render said device non-conductive and provide a predetermined average voltage in said input circuit, a capacitor connected in shunt with said device and automatic gain control means connected between said output circuit and said signal translating means for controlling the gain of said system as a function of the direct current level of the tips of the synchronizing components of the signal in said output circuit.

6. A video signal amplifier comprising in combination, a signal amplifier device including a first, second and third electrodes, a signal input circuit adapted to be direct coupled with the video detector in a color television receiving system and including a pair of impedance elements connected in series between said first and second electrodes, a bypass capacitor connected in shunt with one of said pair of impedance elements, a unilaterally conducting device connected in shunt with said one of said pair of impedance elements, a signal output circuit connected between said third electrode and one of said first and second electrodes, a direct current conductive feedback circuit connected between said third electrode and the junction of said pair of impedance elements, and means for providing a predetermined forward bias across said unilaterally conducting device whereby said device is normally conductive and is rendered non-conductive upon high average luminance signal conditions.

7. A video signal amplifier comprising in combination, a signal amplifier device including first, second and third electrodes, a signal input adapted to be direct coupled with the video detector in a color television receiving system and including a pair of resistors connected in series relation between said first and second electrodes, a bypass capacitor connected in shunt with one of said pair of resistors, a unilaterally conducting device connected in shunt with said one of said pair of resistors, a signal output circuit connected between said third electrode and one of said first and second electrodes, a direct current conductive feedback circuit connected between said third electrode and the junction of said pair of resistors, and means for providing a predetermined forward bias across said unilaterally conducting device whereby said device is normally conductive and is rendered non-conductive upon high average luminance signal condition.

8. A television receiver having, in combination, a source of signals having an alternating current component and a direct current component indicative of the average luminance of a televised scene, means for amplifying said signals, means operably coupling said amplifying means to said source of signals, said amplifying means including means for limiting the transfer of said direct current component to a predetermined maximum value, and means for controlling the gain of said receiver in response to the combined value of said direct current and said alternating current components of said signals at the output of said amplifying means.

9. A video signal amplifier comprising in combination, a signal input circuit adapted to receive a television signal including an alternating current component and a direct current component indicative of the luminance of a televised scene, a signal output circuit, a direct current conductive feedback circuit connected between said input and output circuits, switching means for controlling the feedback in said feedback circuit, means for controlling said switching means in response to said direct current component, to provide one condition of operation under normal average luminance conditions and another condition of operation under average luminance conditions exceeding a predetermined maximum level, said feedback circuit including means effective during said first named switching-condition to provide a given range of direct current transfer characteristic within said amplifier and effective during said second named switching-condition to provide a different predetermined direct current transfer characteristic within said amplifier.

10. A video signal amplifier comprising in combination, a signal amplifier device including a first, second and third electrodes, a signal input adapted to be direct coupled with the video detector in a color television receiving system and including first, second and third impedance elements connected in series between said first and second electrodes, a by-pass capacitor connected between a point of fixed reference potential and the junction of said first and second impedance elements, a unilaterally conducting device connected between said junction and an intermediate tap on said third impedance element, a signal output circuit connected between said third electrode and one of said first and second electrodes, a direct current conductive feedback circuit connected between said third electrode and said junction, and means for providing a predetermined bias across said third impedance element whereby said device is normally conductive and is rendered non-conductive upon high average luminance signal condition.

References Cited in the file of this patent

FOREIGN PATENTS 698,715 Great Britain ------------ Oct. 21, 1953